United States Patent
Tamai et al.

(10) Patent No.: US 9,783,700 B2
(45) Date of Patent: Oct. 10, 2017

(54) OVERCOATING LIQUID, INK SET, IMAGE FORMING METHOD, AND IMAGE FORMING APPARATUS

(71) Applicants: Takashi Tamai, Kanagawa (JP); Michihiko Namba, Kanagawa (JP); Akihiko Gotoh, Kanagawa (JP)

(72) Inventors: Takashi Tamai, Kanagawa (JP); Michihiko Namba, Kanagawa (JP); Akihiko Gotoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 162 days.

(21) Appl. No.: 14/633,328

(22) Filed: Feb. 27, 2015

(65) Prior Publication Data
US 2015/0259567 A1 Sep. 17, 2015

(30) Foreign Application Priority Data
Mar. 11, 2014 (JP) .................. 2014-047899

(51) Int. Cl.
| | | |
|---|---|---|
| *B41M 7/00* | (2006.01) | |
| *C09D 11/322* | (2014.01) | |
| *C09D 11/40* | (2014.01) | |
| *C09D 11/54* | (2014.01) | |
| *C09D 175/04* | (2006.01) | |

(52) U.S. Cl.
CPC .......... *C09D 175/04* (2013.01); *C09D 11/322* (2013.01); *C09D 11/40* (2013.01); *C09D 11/54* (2013.01); *B41M 7/0018* (2013.01); *B41M 7/0036* (2013.01)

(58) Field of Classification Search
CPC . B41M 7/0018; B41M 7/0036; C09D 11/322; C09D 11/40; C09D 11/54; C09D 175/04
See application file for complete search history.

(56) References Cited

U.S. PATENT DOCUMENTS

| | | | | |
|---|---|---|---|---|
| 2003/0144365 A1* | 7/2003 | Schwartz | ............... | B01D 19/04 516/132 |
| 2007/0221078 A1 | 9/2007 | Namba et al. | | |
| 2007/0261597 A1 | 11/2007 | Sao et al. | | |
| 2011/0216123 A1 | 9/2011 | Tamai et al. | | |
| 2011/0310166 A1 | 12/2011 | Namba et al. | | |
| 2012/0176455 A1* | 7/2012 | Ohta | .................... | B41M 5/0011 347/102 |
| 2012/0236066 A1 | 9/2012 | Tamai et al. | | |
| 2013/0053485 A1 | 2/2013 | Misawa et al. | | |
| 2013/0194345 A1 | 8/2013 | Tamai et al. | | |
| 2013/0201252 A1 | 8/2013 | Namba | | |
| 2013/0307912 A1 | 11/2013 | Masuda et al. | | |
| 2014/0253618 A1 | 9/2014 | Masuda et al. | | |
| 2016/0177408 A1* | 6/2016 | Watanabe | ............. | C14C 11/006 428/423.4 |

FOREIGN PATENT DOCUMENTS

| | | |
|---|---|---|
| CN | 1961048 A | 9/2007 |
| CN | 102741367 A | 10/2012 |
| CN | 103242703 A | 8/2013 |
| JP | 2003-192922 A | 7/2003 |
| JP | 2010-221670 | 10/2010 |
| JP | 2011-215564 | 10/2011 |

OTHER PUBLICATIONS

Author Unknown, "Crisvon (Solvent-based), Hydran (Water-based) Resins for Films" from http://www.dic-global.com/us/en/products/polyurethane/leather/film.html, date unknown.*
Chinese search report dated Aug. 26, 2016 in corresponding Chinese Patent Application No. 201510096533.9.

* cited by examiner

*Primary Examiner* — Patrick Niland
(74) *Attorney, Agent, or Firm* — Cooper & Dunham LLP

(57) ABSTRACT

An overcoating liquid contains a hydrodispersible polyurethane; a compound represented by Chemical formula 1: $C_6F_{13}$—$CH_2CH_2O(CH_2CH_2O)_nH$, where n represents an integer of from 1 to 40; a compound represented by Chemical formula 2: $HOR_1R_3C$—$(CH_2)_n$—$CR_2R_4OH$, where $R_1$ and $R_2$ each, independently represent alkyl groups having three to six carbon atoms, $R_3$ and $R_4$ each, independently represent methyl groups or ethyl groups, and n represents an integer of from 1 to 6; and water, wherein the overcoating liquid is applied to the surface of a recording medium onto which inkjet ink is already discharged.

11 Claims, 1 Drawing Sheet

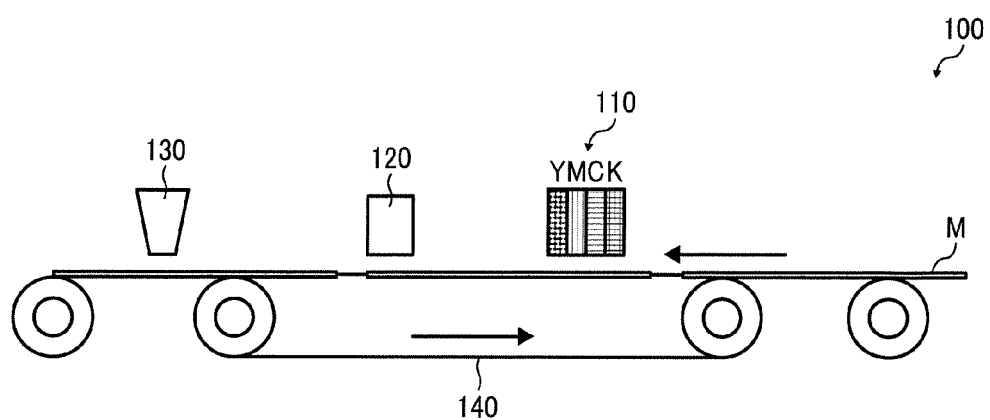

OVERCOATING LIQUID, INK SET, IMAGE FORMING METHOD, AND IMAGE FORMING APPARATUS

CROSS-REFERENCE TO RELATED APPLICATIONS

This patent application is based on and claims priority pursuant to 35 U.S.C. §119(a) to Japanese Patent Application No. 2014-047899, filed on Mar. 11, 2014, in the Japan Patent Office, the entire disclosure of which is hereby incorporated by reference herein.

BACKGROUND

Technical Field

The present invention relates to an overcoating liquid, an ink set, an image forming method, and image forming apparatus.

Background Art

Methods of applying an overcoating liquid to the surface on which images are formed are known to form images on coated paper for commercial printing using an inkjet ink.

However, fixability of the overcoating liquid is insufficient.

This leads to occurrence of image blur. Moreover, resin inks do not have sufficient defoaming ability.

SUMMARY

The present invention provides an improved overcoating liquid which contains a hydro dispersible polyurethane; a compound represented by Chemical formula 1: $C_6F_{13}$—$CH_2CH_2O(CH_2CH_2O)_nH$, where n represents an integer of from 1 to 40; a compound represented by Chemical formula 2: $HOR_1R_3C$—$(CH_2)_n$—$CR_2R_4OH$, where $R_1$ and $R_2$ each, independently represent alkyl groups having three to six carbon atoms, $R_3$ and $R_4$ each, independently represent methyl groups or ethyl groups, and n represents an integer of from 1 to 6; and water, wherein the overcoating liquid is applied to the surface of a recording medium onto which inkjet ink is already discharged.

BRIEF DESCRIPTION OF THE DRAWINGS

Various other objects, features and attendant advantages of the present invention will be more fully appreciated as the same becomes better understood from the detailed description when considered in connection with the accompanying drawing in which like reference characters designate like corresponding parts throughout and wherein:

FIGURE is a schematic diagram illustrating an image forming apparatus according to an embodiment of the present invention.

DETAILED DESCRIPTION

According to an embodiment of the present invention, an overcoating liquid is provided which contains: a hydrodispersible polyurethane; a compound represented by Chemical formula 1: $C_6F_{13}$—$CH_2CH_2O(CH_2CH_2O)_nH$, where n represents an integer of from 1 to 40; a compound represented by Chemical formula 2: $HOR_1R_3C$—$(CH_2)_n$—$CR_2R_4OH$, where $R_1$ and $R_2$ each, independently represent alkyl groups having three to six carbon atoms, $R_3$ and $R_4$ each, independently represent methyl groups or ethyl groups, and n represents an integer of from 1 to 6; and water, wherein the overcoating liquid is applied to the surface of a recording medium onto which inkjet ink is already discharged.

According to an embodiment of the present invention, an inkjet is provided which contains an inkjet ink containing a hydrodispersible colorant, a surfactant, a hydrosoluble organic solvent, and water; and an overcoating liquid containing: a hydrodispersible polyurethane; a compound represented by Chemical formula 1: $C_6F_{13}$—$CH_2CH_2O(CH_2CH_7O)_nH$, where n represents an integer of from 1 to 40; a compound represented by Chemical formula 2: $HOR_1R_3C$—$(CH_2)_n$—$CR_2R_4OH$, where $R_1$ and $R_2$ each, independently represent alkyl groups having three to six carbon atoms, $R_3$ and $R_4$ each, independently represent methyl groups or ethyl groups, and n represents an integer of from 1 to 6; and water, wherein the overcoating liquid is applied to the surface of a recording medium on which the inkjet ink is already discharged.

Next, embodiments of the present disclosure are described with reference to accompanying drawings. The overcoating liquid is used to be applied to the surface of a recording medium onto which an inkjet ink is already discharged. The overcoating liquid contains a hydrodispersible polyurethane, a compound represented by Chemical formula 1, a compound represented by Chemical formula 2, and water. Since the overcoating liquid contains the hydrodispersible polyurethane, the fixability of an image is improved, thereby improving the abrasion resistance of the image. Moreover, since the overcoating liquid contains the compound represented by Chemical formula 1, when the overcoating liquid is applied to the surface of a recording medium onto which an inkjet ink is already discharged, it quickly and uniformly spreads in a wetting manner, thereby reducing occurrence of image blur. Moreover, since the overcoating liquid contains the compound represented by Chemical formula 2, the overcoating liquid has excellent defoamability and reduces occurrence of non-uniform application.

The hydrodispersible polyurethane has no particular limit. Specific examples thereof include, but are not limited to, acrylic-modified urethane and carbonate-modified urethane. These can be used alone or in combination.

There is no specific limit to the method of manufacturing the hydrodispersible polyurethane.

For example, hydrodispersible polyurethane can be manufactured by preparing an aqueous liquid dispersion of a neutralized material of a urethane prepolymer having a carboxylic with an isocyanate group at its end and a vinyl monomer followed by polymerization reaction of the vinyl monomer and thereafter chain elongation reaction of the urethane prepolymer.

The content of the hydrodispersible polyurethane in the overcoating liquid is from 3% by weight to 10% by weight and preferably from 5% by weight to 10% by weight. A content of the hydrodispersible polyurethane in the overcoating liquid that is too low tends to degrade the fixability of an image. By contrast, when the content is too high, the fixability and blocking resistance of an image easily deteriorate.

Specific examples of the compounds represented by Chemical formula 1 having different distributions of n available on market include, but are not limited to, CAPSTONE® FS-30, FS-3100, and FS-34 (manufactured by E.I. du Pont de Nemours and Company).

Incidentally, the distribution of n of the compound represented by Chemical formula 1 can be measured by Nuclear Magnetic Resonance (NMR) or Mass Spectrometry.

The content of the compound represented by Chemical formula 1 in the overcoating liquid is from 0.05% by weight to 1% by weight and preferably from 0.1% by weight to 0.5% by weight. When the content of the compound represented by Chemical formula 1 in the overcoating liquid is too low, image blur tends to occur. To the contrary, when the content is too high, the storage stability of the overcoating liquid easily deteriorates.

There is no specific limit to the selection of the compound represented by Chemical formula 2. A specific example thereof is 2,4,7,9-tetramethyl-4,7-decane diol.

The content of the compound represented by Chemical formula 2 in the overcoating liquid is from 0.2% by weight to 1% by weight and preferably from 0.2% by weight to 0.5% by weight. When the content of the compound represented by Chemical formula 2 in the overcoating liquid is too low, the defoamability of the overcoating liquid tends to deteriorate. To the contrary, when the content is too high, the storage stability of the overcoating liquid easily deteriorates.

The overcoating liquid optionally contains polyethylene wax. This further improves image fixability and blocking resistance.

Incidentally, polyethylene wax contains polyethylene oxide wax.

The content of the polyethylene wax in the overcoating liquid is from 1% by weight to 10% by weight, preferably from 1% by weight to 7% by weight and preferably from 1% by weight to 5% by weight. When the content of the polyethylene wax in the overcoating liquid is too low, image fixability and blocking resistance tend to deteriorate. To the contrary, when the content is too high, the storage stability of the overcoating liquid easily deteriorates.

Specific examples of such polyethylene wax available on market include, but are not limited to, AQUACER-513 and AQUACER-515 (both manufactured by BYK Chemie Japan) and POLYRON P-502 (manufactured by CHUKYO YUSHI CO., LTD.)

The mass ratio of the hydrodispersible polyurethane to the polyethylene wax ranges from 0.1 to 1 and preferably from ⅐ to 1. When the mass ratio of the hydrodispersible polyurethane to the polyethylene wax is too low, image fixability and blocking resistance tend to deteriorate. To the contrary, when the mass ratio is too high, image fixability easily deteriorates.

The overcoating liquid optionally contains other hydrodispersible resins than hydrodispersible polyurethane.

There is no specific limit to the selection of the hydrodispersible resins other than hydrodispersible polyurethane. Specific examples thereof include, but are not limited to, condensation-based synthetic resins such as polyesters, epoxy resins, polyamides, polyethers, (meth)acrylic resins, acrylic-silicone resins, and fluorine-containing resins; addition-based synthetic resins such as polyolefins, polystyrene resins, polyvinyl alcohol-based resins, polyvinyl ester-based resins, polyacrylic acid-based resins, and unsaturated carboxylic acid-based resins; and natural polymers such as celluloses, rosins, and natural rubber. These can be used alone or in combination. Of these, polystyrene-based resins and polyacrylic acid-based resins are preferable.

The overcoating liquid optionally contains a surfactant, a hydrosoluble organic solvent, a pH regulator, a preservatives and fungicides, a corrosion inhibitor, etc. like the inkjet ink described later.

Incidentally, the overcoating liquid can be used together with an inkjet ink as an inkjet.

The inkjet ink contains a hydrodispersible colorant, a surfactant, a hydrosoluble organic solvent, and water.

The content of the hydrosoluble colorant in an inkjet ink is from 6% by weight to 15% by weight and preferably from 8% by weight to 12% by weight. When the content of the hydrosoluble colorant in an inkjet ink is too low, the coloring property of the inkjet ink tends to deteriorate, thereby degrading image density. To the contrary, when the content of the hydrosoluble colorant in an inkjet ink is too high, dots do not easily spread so that image density tends to deteriorate.

There is no specific limit to the selection of the hydrodispersible colorant. Specific examples thereof include, but are not limited to, resin coating type pigments and self-dispersion type pigments. These can be used alone or in combination. Of these, the resin coating type pigments are preferable in terms of image fixability.

Specific examples of the pigments contained in the hydrodispersible colorant include, but are not limited to, organic pigments such as azo-based pigment, phthalocyanine-based pigments, anthraquinone-based pigments, quinacridone-based pigments, dioxadine-based pigments, indigo-based pigments, thioindigo-based pigments, perylene-based pigments, isoindolenone-based pigments, aniline black, azomethine-based pigments, Rhodamine B lake pigments, and carbon black and inorganic pigments such as iron oxide, titanium oxide, calcium oxide, barium oxide, aluminum hydroxide, barium yellow, ferric hexacyanoferrate, cadmium red, chromium yellow, and metal powder. These can be used alone or in combination.

Specific examples of carbon black available on market include, but are not limited to, No. 2300, No. 900, MCF88, No. 40, No. 52, MA7, and MA8, No. 2200B (manufactured by Mitsubishi Chemical Corporation), RAVEN1255 (manufactured by Columbian Chemicals Company), REGAL400R, REGAL 660R, and MOGUL L (manufactured by Cabot Corporation), Color Black FW1, Color Black FW18, Color Black S170, Color Black S150, Printex 35, and Printex U (manufactured by Degussa AG).

There is no particular limit to any surfactant which can improve leveling property. Specific examples thereof include, but are not limited to, fluorine-containing surfactants, silicone-containing surfactants, anionic surfactants, and nonionic surfactants. These can be used alone or in combination. Of these, silicone-containing surfactants and fluorine-containing surfactants are particularly preferred.

The number of carbon atoms replaced with fluoro groups in a fluorine-containing surfactant ranges from 2 to 16 and preferably from 4 to 16. When the number of carbon atoms replaced with fluoro groups in a fluorine-containing surfactant is too small, leveling property easily deteriorates. When the number of carbon atoms replaced with fluoro groups in a fluorine-containing surfactant is too large, discharging stability tends to deteriorate.

Specific examples of the fluorine-containing anionic surfactants include, but are not limited to, perfluoroalkyl sulfonic acid, perfluoroalkyl sulfonic acid salts, perfluoroalkyl carboxylic acid, perfluoroalkyl carboxylic acid salts, perfluoroalkyl phosphoric acid ester salts, sulfuric acid ester salts of polyoxyalkylene ether having a perfluoro alkyloxy group at its side chain.

There is no specific limit to the selection of pair ions of salts of the fluorine-containing anionic surfactants. Specific examples thereof include, but are not limited to, lithium ion, sodium ion, potassium ion, ammonium ion, monoethanol ammonium ion, diethanol ammonium ion, and triethanol ammonium ion.

The fluorine-containing anionic surfactant is:
a compound represented by following chemical formula,

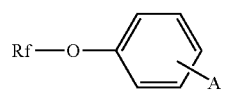

where the symbol $R_f$ represents the group represented by the following chemical formula (I)

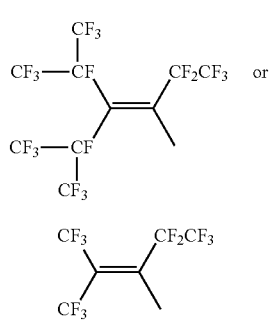

and the symbol A represents $-SO_3^-M^+$, $-COO^-M^+$, or $-PO_3^-M^+$, where $M^+$ represents proton, lithium ion, sodium ion, potassium ion, ammonium ion, monoethanol ammonium ion, diethanol ammonium ion, or triethanol ammonium ion, a compound represented by the chemical formula: $(R_f'O)_nPO(O^-M^+)_m$, where $R_f'$ represents a group represented by $F(CF_2CF_2)_nCH_2CH_2-$ Chemical formula (III), where n represents an integer of from 3 to 10, M+ represents proton, lithium ion, sodium ion, potassium ion, ammonium ion, monoethanol ammonium ion, diethanol ammonium ion, or triethanol ammonium ion, n represents 1 or 2, and m represents 2 - n, a compound represented by the chemical formula: $R_f'SCH_2CH_2COO^-M^+$, where the symbol $R_f'$ represents a group represented by $F(CF_2CF_2)_nCH_2CH_2-$ Chemical formula (III), and $M^+$ represents proton, lithium ion, sodium ion, potassium ion, ammonium ion, monoethanol ammonium ion, diethanol ammonium ion, or triethanol ammonium ion, or a compound represented by the chemical formula: $R_f'SO_3^-M^+$, where the symbol $R_f'$ represents a group represented by Chemical formula (III): $F(CF_2CF_2)_nCH_2CH_2-$, and $M^+$ represents proton, lithium ion, sodium ion, potassium ion, ammonium ion, monoethanol ammonium ion, diethanol ammonium ion, or triethanol ammonium ion.

Specific examples of the fluorine-containing nonionic surfactants include, but are not limited to, perfluoroalkyl phosphoric acid esters, adducts of perfluoroalkyl ethylene oxide, and polyoxyalkylene ether having a perfluoroalkyloxy group in its side chain. Of these, polyoxyalkylene ether having a perfluoroalkyloxy group in its side chain is preferable because of its low foaming property.

The fluorine-containing nonionic surfactant is preferably a compound represented by the chemical formula: $CF_3CF_2(CF_2CF_2)_mCH_2CH_2O(CH_2CH_2O)_nH$, where m represents 0 or an integer of from 1 to 10 and n represents 0 or an integer of from 1 to 0, excluding the case in which both m and n are 0 at the same time), a compound represented by the chemical formula: $R_fO(CH_2CH_2O)_nH$, where the symbol $R_f$ represents a group represented by Chemical formula (I) or a group represented by Chemical formula (II), and n represents an integer of from 5 to 20, or a compound represented by the chemical formula $R_f'O(CH_2CH_2O)_nH$, where the symbol $R_f'$ represents a group represented by Chemical formula (III) and n represents an integer of from 1 to 40.

Preferably, fluorine-containing ampholytic surfactants are represented by the following chemical formula.

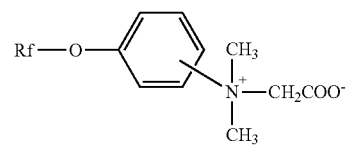

In the chemical formula, the symbol $R_f$ represents a group represented by Chemical formula (I) or a group represented by Chemical formula (II).

Preferably oligomer type fluorine-containing surfactants are represented by the following chemical formula.

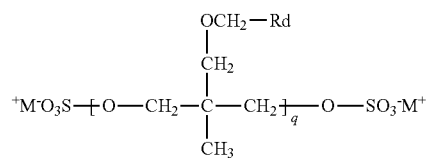

In the chemical formula, the symbol $R_d$ represents a group represented by the chemical formula: $F(CF_2CF_2)_nCH_2^-$, where n represents an integer of from 1 to 4, $M^+$ represents an alkali metal ion such as sodium ion, and potassium ion or a quaternary ammonium group such as triethyl ammonium and triethanol ammonium, and q represents an integer of from 1 to 6, or a compound represented by the following chemical formula.

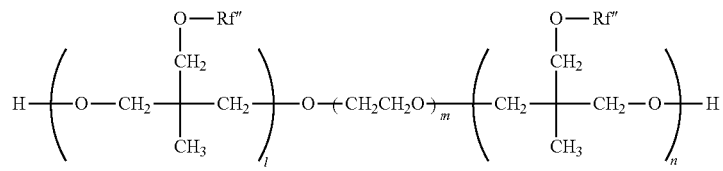

In the chemical formula, Rf″ represents a perfluoroaklyl group having 2 to 22 carbon atoms, m represents an integer of from 6 to 25, l and n each, independently represent 0 or integers of from 1 to 10 excluding the case in which both l and n are 0 at the same time).

Specific examples of the fluorine-containing surfactants available on market include, but are not limited to, SURF- LON S-111, SURFLON S-112, SURFLON S-121, SURF-LON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300 UR (all manufactured by E. I. du Pont de Nemours and Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.), and UNIDYNE DSN-403N (manufactured by DAIKIN INDUSTRIES).

There is no specific limit to the selection of such silicone-based surfactants. Specific examples thereof include, but are not limited to, side chain-modified polydimethyl siloxane, both end-modified polydimethyl siloxane, one end-modified polydimethyl siloxane, and side chain both end-modified polydimethyl siloxane.

Of these, it is preferable to select a polyether-modified silicone-based surfactant having a polyoxyethylene group or polyoxyethylene polyoxypropylene group as the modification group.

Preferably polyether-modified silicone-based surfactants are represented by the following chemical formula.

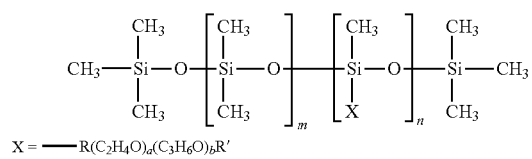

$X = \text{———} R(C_2H_4O)_a(C_3H_6O)_bR'$

In the chemical formula, R represents an alkylene group, R' represents an alkyl group, and m, n, a, and b each, independently represent integers.

Specific examples of polyether-modified silicoe-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

There is no specific limit to the selection of the anionic surfactant. Specific examples thereof include, but are not limited to, polyoxyethylene alkyl ether acetates, dodecyl benzene sulfonates, laurates, and polyoxyethylene alkyl ether sulfates.

There is no specific limit to the selection of the nonionic surfactant. Specific examples thereof include, but are not limited to, polyoxyethylene alkyl ether, polyoxypropylene polyoxyethylene alkyl ether, polyoxyethylene alkyl esters, polyoxy ethylene sorbitan aliphatic acid esters, polyoxyethylene alkyl phenyl ethers, polyoxyethylene alkyl amines, and polyoxyethylenealky amides.

The content of the surfactant in the inkjet ink is from 0.01% by weight to 3% by weight and preferably from 0.5% by weight to 2% by weight. When the content of the surfactant in the inkjet ink is too low, leveling property easily deteriorates. To the contrary, when the content of the surfactant in the inkjet ink is too high, image density easily deteriorates.

There is no specific limit to the selection of the hydrosoluble organic solvent. Specific examples thereof include, but are not limited to, polyols such as ethylene glycol, diethylene glycol, triethylene glycol, polyethylene glycol, polypropylene glycol, 1,3-butane diol, 3-methyl-1,3-butane diol, 1,5-pentane diol, 1,6-hexane diol, 1,8-octane diol, glycerin, diglycerin, 1,2,3-butane triol, 1,2,4-butane triol, 1,2,6-hexane triol, and petriol; polyol alkyl ethers such as ethylene glycol monoethyl ether, ethylene glycol monobutyl ether, diethylene glycol monometyl ether, diethylene glycol monoetyl ether, diethylene glycol monobutyl ether, tetraethylene glycol monomethyl ether, and propylene glycol monoethyl ether; polyol aryl ethers such as ethylene glycol monophenyl ether, and ethylene glycol monobenzyl ether; nitrogen-containing heterocyclic compounds such as N-methyl-2-pyrolidone, N-hydroxyethyl-2-pyrolidone, 1,3-dimethyl imidazolidinone, and ε-caprolactone; amides such as formamide, N-methylformamide, and N,N-dimethylformamide; amines such as monoethanol amine, diethanol amine, triethanol amine, monoethyl amine, diethyl amine, and triethyl amine; sulfur-containing compounds such as dimethyl sulfoxide, sulfolane, and thiodiethanol; propylene carbonate, γ-butyloractone, and ethylene carbonate. These can be used alone or in combination.

Of these, polyols having an equilibrium water amount of 30% by weight or more at 23° C. and 80% RH are preferable in terms that viscosity increase can be subdued even when moisture is lost from washing liquid.

Specific examples of such polyols having an equilibrium water amount of 30% by 1,2,4-butane triol, glycerin, diglycerin, diethylene glycol, triethylene glycol, tetraethylene glycol, and 1,3-butane diol.

Of these, glycerin is preferable.

The content of the hydrosoluble organic solvent in the inkjet ink is from 10% by weight to 50% by weight and preferably from 15% by weight to 40% by weight. The drying property, the storage stability, and the reliability of an ink become good in this range.

The inkjet ink optionally contains a hydrosoluble resin, a pH regulator, a preservatives and fungicides, a corrosion inhibitor, etc.

The hydrodispersible resin is evenly dispersed in water and present in a form of liquid dispersion, emulsion, etc.

There is no specific limit to the selection of the hydrosoluble resin. Specific examples thereof include, but are not limited to, condensation-based synthetic resins such as polyesters, polyurethane, epoxy resins, polyamides, polyethers, (meth)acrylic resins, acrylic-silicone resins, and fluorine-containing resins; addition-based synthetic resins such as polyolefins, polystyrene-based resins, polyvinyl alcohol-based resins, polyvinyl ester-based resins, polyacrylic acid-based resins, and unsaturated carboxylic acid-based resins; and natural polymers such as celluloses, rosins, and natural rubber. Theses can be used alone or in combination. Of these, polyurethane is preferable.

There is no specific limit to the selection of the pH regulator. Specific examples thereof include, but are not limited to, hydroxides of alkali metal elements such as lithium hydroxide, sodium hydroxide, and potassium hydroxide; ammonium hydroxide, hydroxides of quaternary ammonium, hydroxides of quaternary phosphonium, carbonates of alkali metals such as lithium carbonate, sodium carbonate, and potassium carbonate; amines such as diethanol amine and triethanol amine; acidum boricum, hydrochloric acid, nitric acid, sulfuric acid, and acetic acid. These can be used alone or in combination.

The content of the pH regulator in the inkjet ink is from 0.01% by weight to 3% by weight and preferably from 0.5% by weight to 2% by weight.

There is no specific limit to the selection of the preservatives and fungicides. Specific examples thereof include, but are not limited to, benzotriazole, dehydrosodium acetate, sodium sorbinate, 2-pyridine thiol-1-sodium oxide, isothiazoline-based compounds, sodium benzoate, and pentachlorophenol sodium. These can be use alone or in combination.

The content of the preservatives and fungicides in the inkjet ink is from 0.01% by weight to 3% by weight and preferably from 0.5% by weight to 2% by weight.

There is no specific limit to the selection of the corrosion inhibitor. Specific examples thereof include, but are not limited to, acid sulfite, thiosodium sulfate, ammonium thiodiglycolate, diisopropyl ammonium nitrite, pentaerythritol tetranitrate, and dicyclohexyl ammonium nitrite. These can be used alone or in combination.

The content of the corrosion inhibitor in the inkjet ink is from 0.01% by weight to 3% by weight and preferably from 0.5% by weight to 2% by weight.

FIGURE is a schematic diagram illustrating an image forming apparatus according to an embodiment of the present invention.

An image forming apparatus 100 includes an ink discharging device 110, an overcoating liquid application device 120, a drying unit 130, and a transfer unit 140.

Inkjet ink is discharged from the ink discharging device 110 to a recording medium M.

The inkjet discharging device 110 can be any known inkjet head.

Overcoating liquid is discharged from the overcoating liquid application device 120 onto the inkjet ink already discharged to the recording medium M.

The overcoating liquid application device 120 can be any known inkjet head. In place of the overcoating liquid application device 120, an overcoating liquid application unit can be provided to apply an overcoating liquid to substantially the entire area of the surface of the recording medium M onto which the inkjet ink is already discharged.

There is no specific limit to the selection of the methods of applying an overcoating liquid. Specific examples of such methods include, but are not limited to, an inkjet method, a blade coating method, a gravure coating method, a gravure offset coating method, a bar coating method, a roll coating method, a knife coating method, an air knife coating method, a comma coating method, a U comma coating method, an AKKU coating method, a smoothing coating method, a microgravure coating method, a reverse roll coating method, a four or five roll coating method, a dip coating method, a curtain coating method, a slide coating method, and a die coating method.

The drying unit 130 dries with hot air the recording medium M onto which the overcoating liquid is already applied.

Incidentally, the drying unit 130 can use infra red, microwave, a roll heater instead of hot air to heat and dry the recording medium M onto which the overcoating liquid is already applied. It is also possible to naturally dry the recording medium M onto which the overcoating liquid is already applied.

The transfer unit 140 transfers the recording medium M.

There is no specific limit to the transfer unit 140 which can transfer the recording medium M. A specific example thereof is a transfer belt.

The image forming apparatus 100 optionally includes a fixing unit to heat-fix an image formed on the recording medium M.

There is no specific limit to the selection of the fixing unit. A specific example thereof is a fixing roller.

The temperature at which the image formed on the recording medium M is heat-fixed ranges from 50° C. to 150° C. and preferably from 100° C. to 150° C.

There is no specific limit to the selection of the recording medium M. Specific examples thereof include, but are not limited to, plain paper, gloss paper, special paper, cloth, film, transparent sheets, coated paper for commercial printing. Of these, coated paper for commercial printing is preferable in terms that images having excellent image fixability and blocking resistance are formed.

Specific examples of such coated paper for commercial printing include, but are not limited to, RICOH BUISINESS COAT GLOSS 100 (manufactured by RICOH Co., Ltd.), OK TOP COAT+, OK KINFUJI+, and SA KINFUJI+ (all manufactured by Oji Paper Co., Ltd.), SUPER MI DUL, and AURORA COAT (both manufactured by Nippon Paper Industries Co., Ltd.), α matte and μ coat (manufactured by Hokuetsu Paper Co., Ltd.), RAICHO ART and RAICHO SUPER ART (both manufactured by Chuetsu Pulp & Paper Co., Ltd.), and PEARL COAT N (manufactured by Mitsubishi Paper Mills Limited).

Coated paper for commercial printing has coated layers on one or both surfaces of the substrate of the paper. Inkjet ink and overcoating liquid are discharged and applied to the surface of coated paper for commercial printing on which a coated layer is formed.

The transfer amount of pure water is from 1 mL/m$^2$ to 10 mL/m$^2$ when the contact time of the surface of coated paper for commercial printing on which a coated layer is formed is 100 ms. If the transfer amount of pure water is too small when the contact time of the surface of coated paper for commercial printing on which a coated layer is formed is 100 ms, image blur easily occurs. If it is too large, image density tends to deteriorate.

The transfer amount of pure water of the surface of coated paper for commercial printing on which a coated layer is formed can be measured by a dynamic scanning absorptometer (K350 Series D type, manufactured by KYOWA SEIKO INC.). The transfer amount of pure water in the contact time of 100 ms is obtained by interpolation from the measuring result of the transfer amount of pure water for the contact time around 100 ms.

There is no specific limit to the selection of the substrate. For example, paper mainly formed of wood fiber and a sheet material such as non-woven cloth mainly formed of wood fiber and synthesized fiber are suitable.

There is no specific limit to selection of wood fiber. For example, wood pulp and waste paper pulp are suitable.

Specific examples of the wood pulp include, but are not limited to, L-Breached Kraft Pulp (LBKP), N-Breached Kraft Pulp, N-Breached Sulfite Pulp (NBSP), L-Breached Sulfite Pulp (LBSP), Ground Pulp (GP), and Thermo-Mechanical Pulp (TMP).

Specific examples of the materials for the waste paper pulp include, but are not limited to, {waste paper (broke) of} high quality white paper without print, {waste paper (broke) of} lined white paper without print, {waste paper (broke) of} high quality cream paper without print, {waste paper (broke) of} cardboard, {waste paper (broke) of} medium quality paper without print, {waste paper of} white paper with black print, {waste paper (broke) of} woody paper without print, (waste paper of) white paper with color print, (waste paper of) white paper or art paper with color print, {waste paper (broke) of} art paper without print, (waste paper of) medium quality paper with color print, (waste paper of) woody paper with print, waste paper of newspaper, waste paper of magazine, etc. specified in the waste paper quality specification list by Paper Recycling Promotion Center. To be specific, these are chemical pulp paper and high-yield pulp containing paper, which are waste paper of paper and paper board paper such as print paper such as non-coated computer paper, thermal paper, and pressure-sensitive paper; OA waste paper such as plain photocopying paper; coated paper such as art paper, coated paper, micro-coated paper, and matt coated paper; non-coated paper such as high-quality paper, high quality colored paper, note, letter paper, package paper, cover paper, medium quality paper, newsprint paper, woody paper, super wrapping paper, imitation Japanese vellum, machine glazed poster paper, and polyethylene-coated paper. These can be used alone or in combination.

The waste paper pulp is manufactured by a combination of the following four processes:

(1): In maceration, waste paper is subject to mechanical force and drugs by a pulper to make unstiffened fiber, from which the printed ink is detached.

(2): In dust removal, foreign objects such as plastic contained in waste paper and dirt are removed by a screen, a cleaner, etc.

(3): In removal of ink, the printed ink detached from the fiber by using a surfactant is removed outside the system by a flotation method or a washing method.

(4) In bleaching, the degree of white is improved using oxidation and reduction.

When the waste paper pulp is mixed, the mixing ratio of the waste paper pulp in all the pulp is preferably 40% or less considering prevention of curling.

There is no specific limit to selection of loaded fillers for use in the substrate. Specific examples thereof include, but are not limited to, inorganic white pigments such as light calcium carbonate, heavy calcium carbonate, kaolin, clay, tulc, calcium sulfate, barium sulfate, titanium dioxide, zinc oxide, zinc sulfide, zinc carbonate, satin white, aluminum silicate, diatom earth, calcium sillicate, magnesium silicate, synthesized silica, aluminum hydroxide, alumina, lithopone, zeolite, magnesium carbonate, and magnesium hydroxide: organic pigments such as styrene-based plastic pigment, acrylic-based plastic pigments, polyethylene, microcapsule, urea resins, and melamine resins. These can be used alone or in combination.

There is no specific limit to selection of internal sizing agents for use in sheet-making the substrate. Specific examples thereof include, but are not limited to, neutral rosin-based rosin-based sizing agents, alkenyl succinic anhydride (ASA), alkyl ketene dimer (AKD), and petroleum resin sizing agents for use in neutral paper-making. Of these, neutral rosin-based sizing agents and alkenyl succinic anhydride are particularly preferable.

The substrate has a thickness of from 50 μm to 300 μm.

The weight of the substrate is preferably from 45 g/m² to 290 g/m².

The coated layer contains pigments and binder resins.

Inorganic pigments and mixtures of inorganic pigments and organic pigments can be used as the pigment.

There is no specific limit to selection of the inorganic pigments. Specific examples thereof include, but are not limited to, kaolin, tulc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide, and chlorite.

Specific examples of kaolin include, but are not limited to, delaminated kaolin, baked kaolin, and engineered kaloin by surface-reforming, etc.

Considering gloss demonstration of kaolin, it is preferable that the content of kaolin having a particle diameter of 2 μm in an amount of 80% by weight or more accounts for 50% by weight.

The mass ratio of kaolin to a binder is 0.5 or higher. When the mass ratio of kaolin to a binder is too small, gloss tends to deteriorate. On the other hand, considering the fluidity of kaolin, thickening under a high shearing force in particular, the mass ratio of kaolin to a binder is preferably 0.9 or less in terms of applicability.

Organic pigments have excellent gloss demonstration and small specific gravity in comparison with inorganic pigments so that it is possible to form a bulky coated layer having a high gloss with good surface covering property.

There is no specific limit to selection of the organic pigments. Specific examples thereof include, but are not limited to, particles of styrene-acrylic copolymers, particles of styrene-butadien copolymers, polystyrene particles, and polyethylene particles. These can be used alone or in combination.

The mass ratio of the organic pigment to the total mass of the inorganic pigment and organic pigment is from 0.02 to 0.2. When the mass ratio of the organic pigment to the total mass of the inorganic pigment and organic pigment is too small, the effect of addition of organic pigments is not easily obtained. When the mass ratio of the organic pigment to the total mass of the inorganic pigment and organic pigment is too large, the fluidity of a liquid application tends to deteriorate and application workability easily deteriorates, which is not economical in terms of cost.

Organic pigments take forms of solid type, hollow type, and doughnut type, etc.

The organic pigment has a volume average particle diameter of from 0.2 μm to 3.0 μm considering the balance between gloss demonstration, surface covering, and fluidity of a liquid application.

The void ratio of organic pigments of hollow type is 40% or more.

There is no specific limit to selection of binder resins. Specific example thereof include, but are not limited to, hydrosoluble resins and hydrodispersible resins.

The mass ratio of the binder resin to the pigment is from 0.02 to 1 and preferably from 0.03 to 0.5.

There is no specific limit to the hydrosoluble resins. Specific examples thereof include, but are not limited to, polyvinyl alcohol, modified polyvinyl alcohols such as anion-modified polyvinyl alcohol, cation-modified polyvinyl alcohol, and acetal-modified polyvinyl alcohol; polyurethane; polyvinyl pyrrolidone and modified polyvinyl pyrolidones such as copolymers of polyvinyl pyrolidone and vinyl acetate, copolymers of vinyl pyrolidone and dimethyl aminoethyl methacrylic acid; copolymers of quaternarized vinyl pyrolidone and dimethyl aminoethyl methacrylic acid; and copolymers of vinyl pyrolidone and methacrylic amide propyl trimethyl ammonium chloride; celluloses such as carboxymethyl cellulose, hydroxyethyl cellulose, and hydroxy propyl cellulose; modified celluloses such as cationized hydroxyethyl cellulose; synthetic resins such as polyesters, polyacrylates, melamine resins, their modified products, and copolymers of polyesters and polyurethane; poly(meth)acrylic resins, poly(meth)acrylic amides, oxidized starch, phosphate starch, self-modified starch, cationized starch, other modified starches, polyethylene oxide, sodium polyacrylates, and sodium alginate. Of these, in terms of absorption property of inkjet ink, polyvinyl alcohol, cation-modified polyvinyl alcohol, acetal-modified polyvinyl alcohol, polyesters, polyurethanes, and copolymers of polyester and polyurethane are preferable.

There is no specific limit to the hydrodispersible resins. Specific examples thereof include, but are not limited to, polyvinyl acetate, copolymers of ethylene and vinyl acetate, polystyrene, copolymers of styrene and (meth)acrylate, (meth)acrylate polymers, copolymers of vinyl acetate and (meth)acrylate, styrene and butadiene copolymers, ethylene and propylene copolymers, polyvinyl ethers, silicone and acrylic copolymers. These can be used alone or in combination.

Optionally, the hydrodispersible resin can contain cross-linking agents such as methylolated melamine, methylolated urea, methylolated hydroxy propylene urea, and isocyanate. Copolymers having a self-cross-linking property that contains units derived from N-methylol acrylic amide, etc. are also suitable.

The coated layer optionally contains a surfactant. By containing a surfactant, water resistance of an image is improved and image density is also improved, thereby subduing occurrence of image blur.

There is no specific limit to the surfactant. Any of anionic surfactants, cationic active agents, amphoteric active agents, and non-ionic active agent can be used. Of these, nonionic surfactants are preferred.

Specific examples of the nonionic surfactants include, but are not limited to, adducts of higher alcohol with ethylene oxides, adducts of alkyl phenol with ethylene oxides, adducts of aliphatic acid with ethylene oxide, adducts of aliphatic acid with ethylene oxide, adducts of polyol aliphatic ester with ethylene oxide, adducts of higher aliphatic acid amine with ethylene oxide, adducts of aliphatic acid amide ethylene oxide, adducts of fat with ethylene oxide, adducts of polypropylene glycol with ethylene oxide, aliphatic acid esters of glycerol, aliphatic acid esters of pentaerythritol, aliphatic acid esters of sorbitol and sorbitane, aliphatic acid esters of sucrose, alkyl ethers of polyol, and aliphatic acid amides of alkanol amines. These can be used alone or in combination.

There is no specific limit to the polyol. Specific examples thereof include, but are not limited to, glycerol, trimethylol propane, pentaerythritol, sorbitol, and sucrose.

Incidentally, as for adducts with ethylene oxides, in addition to ethylene oxide, alkylene oxide such as propylene oxide and butylene oxide can be added.

The ratio of ethylene oxide in all alkylene oxide is from 50 mol % or higher.

The HLB value of the nonionic surfactant is from 4 to 15 and preferably from 7 to 13.

The coated layer optionally contains aluminum powder, a pH regulator, a preservative, and an antioxidant.

The coated layer can be formed by impregnating a substrate with a liquid application or applying a liquid application thereto.

There is no specific limit to an applicator for use in forming a coated layer. Specific examples thereof include, but are not limited to, a conventional size press, a gate roll size press, a film transfer press, a blade coater, a rod coater, an air knife coater, and a curtain coater.

The coated layer can be formed by impregnating a substrate with a liquid application or applying a liquid application to a substrate using a conventional size press, a gate roll size press, or a film transfer size press installed in a paper-making machine and finished on-machine.

The attachment amount (solid portion) of a liquid application ranges from 0.5 g/m$_2$ to 20 g/m$^2$.

After a substrate is impregnated with a liquid application or a liquid application is applied to a substrate, the substrate can optionally be dried.

The temperature at which the liquid application is dried is from 10° C. to 250° C.

As for coated paper for commercial printing, a back layer is optionally formed on the surface of the substrate on which no coated layer is formed. Moreover, in the case of coated paper for commercial printing, it is possible to form other layers between the substrate and the coated layer and/or the substrate and the back layer. Furthermore, a protective layer can be formed on the coated layer of coated paper for commercial printing. Each of these layers can have a single layer structure or laminate structure.

If images are formed as described above and the surfaces on which coated layers are formed of overcoating liquid for coated paper for commercial printing are rubbed against each other, the coefficient of static friction and the coefficient of kinetic friction therebetween are within ranges of from 0.3 to 0.7 and from 0.1 to 0.4, respectively. In addition, if images are formed as described above and the surface on which a coated layer is formed of overcoating liquid for coated paper for commercial printing is rubbed against the surface on which a coated layer is formed with no overcoating liquid layer on, the coefficient of static friction and the coefficient of dynamic friction therebetween (top surface and back surface) are within ranges of from 0.3 to 0.7 and from 0.1 to 0.4, respectively.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Preparation of Liquid Dispersion of Resin-Coverage Type Black Pigment

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were mixed in the flask followed by heating to 65° C. Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18 g of methylethyl ketone was dripped to the flask in two and a half hours. Subsequently, a liquid mixture of 0.8 g of azobis methyl valeronitrile and 18 g of methylethyl ketone was dripped to the flask in half an hour. After one-hour aging at 65° C., 0.8 g of azobismethyl valeronitrile was added followed by further one-hour aging. Moreover, 364 g of methylethyl ketone was added to the flask to obtain 800 g of a resin solution having a concentration of 50% by weight.

28 g of the resin solution, 42 g of carbon black FW100 (manufactured by Degussa AG), 13.6 g of 1M potassium hydroxide solution, 20 g of methylethyl ketone, and 13.6 g of deionized water were stirred and thereafter mixed and kneaded with a roll mill to obtain a paste. The thus-obtained paste was charged in 200 g of deionized water. Subsequent to stirring, methylethyl ketone and water were distiled away using an evaporator. Furthermore, the resultant was filtered under a pressure with a polyvinylidene fluoride membrane filter having an average hole diameter of 5.0 µm to obtain a liquid dispersion of a resin coverage type black pigment having a content of pigment of 15% by weight and a solid portion of 20% by weight.

The median diameter of the thus-obtained liquid dispersion of a resin coverage type black pigment was 104 nm when measured by a particle size distribution measuring instrument (NANOTRAC UPA-EX150, manufactured by NIKKISO CO., LTD.).

Preparation of Inkjet Ink 15 parts of 1,3-butane diol serving as hydrosoluble organic solvent, 15 parts of glycerin, 2 parts of 1,8-octane diol, and 1 part of fluorine-containing nonionic surfactant (PolyFox™, manufactured by Omnova Solutions, Inc.) were stirred and mixed for one hour. Thereafter, 40 parts of the liquid dispersion of a resin coverage type black pigment and 27 parts of water were added to the mixture. Subsequent to one hour stirring, the resultant was filtrated under a pressure using a cellulose acetate membrane having an average hole diameter of 0.8 µm to obtain an inkjet ink.

Example 1

22 parts of 1,3-butane diol, 11 parts of glycerin, 15 parts of polyurethane emulsion (SU-U0705, manufactured by Japan Coating Resin Corporation) having a solid portion of 35% by weight, 2 parts of 2-ethyl-1,3-hexane diol, 0.1 parts of fluorine-containing nonionic surfactant (Capstone™ FS-3100, manufactured by E.I. du Pont de Nemours and Company), 0.4 parts of 2,4,7,9-tetramethyl-4,7-decane diol, 0.2 parts of preservatives and fungicides (PROXEL™LV, available from Avecia), and 49.3 parts of water were mixed to obtain a overcoating liquid.

Incidentally, fluorine-containing nonionic surfactant (Capstone™ FS-3100, manufactured by E.I. du Pont de Nemours and Company) are compounds represented by Chemical formula 1 with an n of from 7 to 17.

Example 2

22 parts of 3-methyl-1,3-butane diol, 11 parts of glycerin, 20 parts of polyurethane emulsion (SU-100, manufactured by Japan Coating Resin Corporation) having a solid portion of 35% by weight, 2 parts of 2-ethyl-1,3-hexane diol, 1 part of fluorine-containing nonionic surfactant (Capstone™ FS-3100, manufactured by E.I. du Pont de Nemours and Company), 1 part of 2,4,7,9-tetramethyl-4,7-decane diol, 0.2 parts of preservatives and fungicides (PROXEL™LV, available from Avecia), and 42.8 parts of water were mixed to obtain a overcoating liquid.

Example 3

22 parts of 1,3-butane diol, 11 parts of glycerin, 15 parts of polyurethane emulsion (SU-U0705, manufactured by Japan Coating Resin Corporation) having a solid portion of 35% by weight, 2 parts of 2-ethyl-1,3-hexane diol, 0.05 parts of fluorine-containing nonionic surfactant (Capstone™ FS-3100, manufactured by E.I. du Pont de Nemours and Company), 0.1 parts of 2,4,7,9-tetramethyl-4,7-decane diol, 0.2 parts of preservatives and fungicides (PROXEL™LV, available from Avecia), 10 parts of polyethylene wax (PORIRON P502, manufactured by CHUKYO YUSHI CO., LTD.) having a solid portion of 30% by weight, and 39.65 parts of water were mixed to obtain an overcoating liquid.

Example 4

22 parts of 3-methyl-1,3-butane diol, 11 parts of glycerin, 20 parts of polyurethane emulsion (SU-100, manufactured by Japan Coating Resin Corporation) having a solid portion of 35% by weight, 2 parts of 2-ethyl-1,3-hexane diol, 1.5 parts of fluorine-containing nonionic surfactant (Capstone™ FS-3100, manufactured by E.I. du Pont de Nemours and Company), 1 part of 2,4,7,9-tetramethyl-4,7-decane diol, 0.2 parts of preservatives and fungicides (PROXEL™LV, available from Avecia), 25 parts of polyethylene wax (PORIRON P502, manufactured by CHUKYO YUSHI CO., LTD.) having a solid portion of 30% by weight, and 17.3 parts of water were mixed to obtain an overcoating liquid.

Example 5

22 parts of 1,3-butane diol, 11 parts of glycerin, 15 parts of polyurethane emulsion (SU-U0705, manufactured by Japan Coating Resin Corporation) having a solid portion of 35% by weight, 2 parts of 2-ethyl-1,3-hexane diol, 0.03 parts of fluorine-containing nonionic surfactant (Capstone™ FS-3100, manufactured by E.I. du Pont de Nemours and Company), 0.1 parts of 2,4,7,9-tetramethyl-4,7-decane diol, 0.2 parts of preservatives and fungicides (PROXEL™LV, available from Avecia), 15 parts of polyethylene oxide wax (AQUACER-515, manufactured by BYK Japan KK) having a solid portion of 35% by weight, and 34.67 parts of water were mixed to obtain an overcoating liquid.

Example 6

22 parts of 3-methyl-1,3-butane diol, 11 parts of glycerin, 20 parts of polyurethane emulsion (SU-100, manufactured by Japan Coating Resin Corporation) having a solid portion of 35% by weight, 2 parts of 2-ethyl-1,3-hexane diol, 0.05 parts of fluorine-containing nonionic surfactant (Capstone™ FS-3100, manufactured by E.I. du Pont de Nemours and Company), 0.2 part of 2,4,7,9-tetramethyl-4,7-decane diol, 0.2 parts of preservatives and fungicides (PROXEL™LV, available from Avecia), 2 parts of polyethylene wax (PORIRON P502, manufactured by CHUKYO YUSHI CO., LTD.) having a solid portion of 30% by weight, and 42.55 parts of water were mixed to obtain an overcoating liquid.

Example 7

22 parts of 1,3-butane diol, 11 parts of glycerin, 15 parts of polyurethane emulsion (SU-U0705, manufactured by Japan Coating Resin Corporation) having a solid portion of 35% by weight, 2 parts of 2-ethyl-1,3-hexane diol, 0.05 parts of fluorine-containing nonionic surfactant (Capstone™ FS-3100, manufactured by E.I. du Pont de Nemours and Company), 0.1 parts of 2,4,7,9-tetramethyl-4,7-decane diol, 0.2 parts of preservatives and fungicides (PROXEL™LV, available from Avecia), 1 part of polyethylene oxide wax (AQUACER-515, manufactured by BYK Japan KK) having a solid portion of 35% by weight, and 48.65 parts of water were mixed to obtain an overcoating liquid.

Example 8

22 parts of 3-methyl-1,3-butane diol, 11 parts of glycerin, 20 parts of polyurethane emulsion (SU-100, manufactured by Japan Coating Resin Corporation) having a solid portion of 35% by weight, 2 parts of 2-ethyl-1,3-hexane diol, 0.2 parts of fluorine-containing nonionic surfactant (Capstone™ FS-30, manufactured by E.I. du Pont de Nemours and Company), 0.2 part of 2,4,7,9-tetramethyl-4,7-decane diol, 0.2 parts of preservatives and fungicides (PROXEL™LV, available from Avecia), 2 parts of polyethylene wax (PORIRON P502, manufactured by CHUKYO YUSHI CO., LTD.) having a solid portion of 30% by weight, and 42.4 parts of water were mixed to obtain an overcoating liquid.

Incidentally, fluorine-containing nonionic surfactant (Capstone™ FS-30, manufactured by E.I. du Pont de Nemours and Company) are compounds represented by Chemical formula 1 with an n of from 6 to 22.

Example 9

22 parts of 1,3-butane diol, 11 parts of glycerin, 15 parts of polyurethane emulsion (SU-U0705, manufactured by Japan Coating Resin Corporation) having a solid portion of 35% by weight, 2 parts of 2-ethyl-1,3-hexane diol, 0.3 parts of fluorine-containing nonionic surfactant (Capstone™ FS-34, manufactured by E.I. du Pont de Nemours and Company), 0.1 parts of 2,4,7,9-tetramethyl-4,7-decane diol, 0.2 parts of preservatives and fungicides (PROXEL™LV, available from Avecia), 1 part of polyethylene oxide wax (AQUACER-515, manufactured by BYK Japan KK) having a solid portion of 35% by weight, and 48.4 parts of water were mixed to obtain an overcoating liquid.

Incidentally, fluorine-containing nonionic surfactant (Capstone™ FS-34, manufactured by E.I. du Pont de Nemours and Company) are compounds represented by Chemical formula 1 with an n of from 5 to 20.

Comparative Example 1

22 parts of 1,3-butane diol, 11 parts of glycerin, 15 parts of styrene-acrylic acid copolymer emulsion (SAE1014, manufactured by Zeon Corporation), 2 parts of 2-ethyl-1,3-hexane diol, 1.5 parts of anionic surfactant (ECTD-3NEX, polyoxyethylene (3) tridecyl ether sodium acetate, manufactured by Nikko Chemicals Co., Ltd.), 0.5 parts of 2,4,7,9-tetramethyl-4,7-decane diol, 0.2 parts of preservatives and fungicides (PROXEL™LV, available from Avecia), and 47.8 parts of water were mixed to obtain an overcoating liquid.

Comparative Example 2

22 parts of 1,3-butane diol, 11 parts of glycerin, 15 parts of polyurethane emulsion (SU-U0705, manufactured by Japan Coating Resin Corporation) having a solid portion of 35% by weight, 2 parts of 2-ethyl-1,3-hexane diol, 1 part of nonionic surfactant (UNISAFE A-LY, polyoxyethylene palm oil alkyl dimethyl amine oxide, manufactured by NOF CORPORATION), 0.3 parts of 2,4,7,9-tetramethyl-4,7-decane diol, 0.2 parts of preservatives and fungicides (PROXEL™LV, available from Avecia), 14 parts of polyethylene oxide wax (AQUACER-515, manufactured by BYK Japan KK) having a solid portion of 35% by weight, and 34.5 parts of water were mixed to obtain an overcoating liquid.

Comparative Example 3

22 parts of 1,3-butane diol, 11 parts of glycerin, 15 parts of polyurethane emulsion (SU-100, manufactured by Japan Coating Resin Corporation) having a solid portion of 35% by weight, 2 parts of 2-ethyl-1,3-hexane diol, 1 part of fluorine-containing nonionic surfactant (ZONYL™ FS-300, polyoxyethylene perfluoroalkyl ether, manufactured by E.I. du Pont de Nemours and Company) having an effective component of 40% by weight, 0.2 parts of preservatives and fungicides (PROXEL™LV, available from Avecia), 14 parts of polyethylene oxide wax (AQUACER-515, manufactured by BYK Japan KK) having a solid portion of 35% by weight, and 34.8 parts of water were mixed to obtain an overcoating liquid.

Comparative Example 4

22 parts of 1,3-butane diol, 11 parts of glycerin, 15 parts of polyurethane emulsion (SU-100, manufactured by Japan Coating Resin Corporation) having a solid portion of 35% by weight, 2 parts of 2-ethyl-1,3-hexane diol, 1.5 parts of anionic surfactant (ECTD-3NEX, polyoxyethylene (3) tridecyl ether sodium acetate, manufactured by Nikko Chemicals Co., Ltd.), 0.2 parts of preservatives and fungicides (PROXEL™LV, available from Avecia), 14 parts of polyethylene oxide wax (AQUACER-515, manufactured by BYK Japan KK) having a solid portion of 35% by weight, and 34.3 parts of water were mixed to obtain an overcoating liquid.

Comparative Example 5

22 parts of 1,3-butane diol, 11 parts of glycerin, 20 parts of polyurethane emulsion (SU-100, manufactured by Japan Coating Resin Corporation) having a solid portion of 35% by weight, 2 parts of 2-ethyl-1,3-hexane diol, 0.05 parts of fluorine-containing nonionic surfactant (Capstone™ FS-3100, manufactured by E.I. du Pont de Nemours and Company), 0.2 parts of preservatives and fungicides (PROXEL™LV, available from Avecia), and 44.3 parts of water were mixed to obtain an overcoating liquid.

Comparative Example 6

22 parts of 1,3-butane diol, 11 parts of glycerin, 15 parts of polyurethane emulsion (SU-100, manufactured by Japan Coating Resin Corporation) having a solid portion of 35% by weight, 2 parts of 2-ethyl-1,3-hexane diol, 0.5 parts of 2,4,7,9-tetramethyl-4,7-decane diol, 0.2 parts of preservatives and fungicides (PROXEL™LV, available from Avecia), 14 parts of polyethylene oxide wax (AQUACER-515, manufactured by BYK Japan KK) having a solid portion of 35% by weight, and 35.3 parts of water were mixed to obtain an overcoating liquid.

Thereafter, fixability, image blur, and friction coefficient were evaluated. In addition, the storage stability and defoamability of the overcoating liquid were evaluated.

Fixability

An image forming apparatus 100 (refer to FIGURE), an inkjet ink, and an overcoating liquid were used to form a solid image with a resolution of 1,200 dpi on coated paper for commercial printing. As the coated paper for commercial printing, LumiArtGross (manufactured by Store Enso) was used which had a weight of 90 g/m$^2$ and a transfer amount of pure water of 2.3 mL/m$^2$ when the contact time of the surface on which the coated layer was formed was 100 ms. Moreover, the attachment (solid portion) amounts of the inkjet ink and the overcoating liquid on the coated paper for commercial printing were 9.5 g/m$^2$ and 3 g/m$^2$, respectively.

Three hours after the solid image was formed, white cotton cloth (manufactured by TOYO SEIKI Co., Ltd.) attached to a clock meter (manufactured by TOYO SEIKI Co., Ltd.) was moved back and forth on the solid image portion ten times and contamination of the ink on the white cotton was visually checked to evaluate smearing fixability. The evaluation rating is as follows: level 5: no contamination at all, level 4: slightly contaminated, level 3:

contaminated but causing no practical problem at all, level 2: rather significantly contaminated, level 1: significantly contaminated.

Image Blur

An image forming apparatus 100 (refer to FIGURE), an inkjet ink, and an overcoating liquid were used to form an image pattern with 100% duty to evaluate image blur. As the coated paper for commercial printing, LumiArtGross (manufactured by Store Enso) was used, which had a weight of 90 g/m$^2$ and a transfer amount of pure water of 2.3 mL/m$^2$ when the contact time of the surface on which the coated layer was formed was 100 ms. Moreover, the attachment (solid portion) amounts of the inkjet ink and the overcoating liquid on the coated paper for commercial printing were 9.5 g/m$^2$ and 3 g/m$^2$, respectively and the image pattern was formed with one pass. Evaluation rating is as follows: level A: boundary clearly recognized with no image blur, level B: slight image blur but boundary recognizable, level C: image blur occurred and boundary slightly blurred, level D: image blur occurred and boundary unrecognizable Friction Coefficient An image forming apparatus 100 (refer to FIGURE), an inkjet ink, and an overcoating liquid were used to form a solid image with a resolution of 1,200 dpi on coated paper for commercial printing. As the coated paper for commercial printing, LumiArtGross (manufactured by Store Enso) was used, which had a weight of 90 g/m$^2$ and a transfer amount of pure water of 2.3 mL/m$^2$ when the contact time of the surface on which the coated layer was formed was 100 ms. Moreover, the attachment (solid portion) amounts of the inkjet ink and the overcoating liquid on the coated paper for commercial printing were 9.5 g/m$^2$ and 3 g/m$^2$, respectively.

Thereafter, according to the measuring method of Paper and board-Determination of the static and kinetic coefficients of friction (JIS P8147:2010), friction coefficients were measured by using a surface texture measuring instrument (HEIDON Tribogear Type: 14DR, manufactured by Shinto Scientific Co., Ltd.). Specifically, the solid image portion of 7 cm×8 cm of a coated paper for commercial printing on which the solid image was formed was set on the base side of the measuring instrument. Thereafter, the solid image portion (top surface to top surface) of 6.5 cm×12 cm of a coated paper for commercial printing on which the solid image was formed or the surface (top surface and back surface) of a coated paper for commercial printing on which an image was to be formed while no solid image was formed was attached to ASTM plane indenter having a rubber backing and set on the upper side. Furthermore, while a load of 800 g/m$^2$ was applied, the stage on which the sample was placed was moved 6 cm at a speed of 1,200 mm/min. to measure the coefficient (top surface against top surface) or the coefficient (top surface against rear surface)

Storage Stability

After the overcoating liquid was stored at 70° C. for two weeks, the fluctuation of the viscosity of the overcoating liquid before and after the storage was measured to evaluate storage stability. Evaluation rating is as follows: level A: the fluctuation of the viscosity of the overcoating liquid before and after storage was less than 3%, level B: from 3% to less than 5%, level C: from 5% to less than 10%, level D: 10% or greater.

Defoamability

In an environment of 25° C., after 10 mL of the overcoating liquid was charged into 100 mL cylinder, air having a constant pressure was infused therein until the volume of the overcoating liquid and air bubble. The time until all the air bubbles disappeared was measured to evaluate defoamability. Evaluation rating is as follows: level AA: less than 60 seconds until all the air bubbles disappeared, level A: from 60 seconds to less than 150 seconds, level B: from 150 seconds to less than 300 seconds, level C: from 300 seconds to less than 600 seconds, level D: 600 seconds or greater.

The evaluation results of fixability, image blur, coefficients, storage stability of overcoating liquid, and defoamability of overcoating liquid are shown in Table 1.

TABLE 1

| | | | Static coefficient of friction | | Kinetic coefficient of friction | | | |
|---|---|---|---|---|---|---|---|---|
| | Fixability | Image blur | Top to top | Top to back | Top to top | Top to back | Storage stability | Defoamability |
| Example 1 | 4 | A | 0.71 | 0.63 | 0.44 | 0.45 | B | AA |
| Example 2 | 4 | A | 0.73 | 0.65 | 0.46 | 0.48 | A | B |
| Example 3 | 5 | A | 0.46 | 0.39 | 0.26 | 0.21 | A | AA |
| Example 4 | 5 | A | 0.36 | 0.35 | 0.18 | 0.20 | A | B |
| Example 5 | 5 | A | 0.43 | 0.38 | 0.24 | 0.22 | A | AA |
| Example 6 | 5 | A | 0.66 | 0.49 | 0.44 | 0.31 | A | AA |
| Example 7 | 5 | A | 0.72 | 0.52 | 0.46 | 0.34 | A | A |
| Example 8 | 5 | B | 0.57 | 0.46 | 0.42 | 0.39 | A | B |
| Example 9 | 5 | A | 0.53 | 0.47 | 0.39 | 0.36 | A | A |
| Comparative Example 1 | 3 | C | Upper limit of measuring | 2.12 | 0.73 | 0.82 | C | D |
| Comparative Example 2 | 4 | C | 0.52 | 0.45 | 0.25 | 0.31 | C | D |
| Comparative Example 3 | 5 | B | 0.46 | 0.39 | 0.26 | 0.24 | C | D |
| Comparative Example 4 | 5 | C | 0.44 | 0.41 | 0.23 | 0.29 | D | D |

TABLE 1-continued

|  | Fixability | Image blur | Static coefficient of friction | | Kinetic coefficient of friction | | Storage stability | Defoamability |
|---|---|---|---|---|---|---|---|---|
|  |  |  | Top to top | Top to back | Top to top | Top to back |  |  |
| Comparative Example 5 | 4 | A | 0.73 | 0.71 | 0.45 | 0.51 | D | D |
| Comparative Example 6 | 5 | D | 0.47 | 0.42 | 0.31 | 0.28 | C | A |

As seen in the results shown in Table 1, the overcoating liquids of Examples 1 to 9 had excellent defomability, foamed images on coated paper for commercial printing with excellent fixability, and also subdued occurrence of image blur.

By contrast, since the overcoating liquid of Comparative Example 1 had no hydrodispersible polyurethane or compound represented by Chemical formula 1 but non-fluorine-containing surfactant, fixability and defoamability deteriorated, resulting in occurrence of image blur.

Since the overcoating liquid of Comparative Example 2 had no compound represented by Chemical formula 1 but non-fluorine-containing surfactant, defoamability deteriorated, resulting in occurrence of image blur.

Since the overcoating liquid of Comparative Example 3 had no compound represented by Chemical formula 1 nor compound represented by Chemical formula 2 but a fluorine-containing surfactant, defoamability deteriorated, so that image blur slightly occurred.

Since the overcoating liquid of Comparative Example 4 had no compound represented by Chemical formula 1 or compound represented by Chemical formula 2 but a non-fluorine-containing surfactant, defoamability deteriorated, so that image blur occurred.

Moreover, since the overcoating liquid of Comparative Example 5 contained no compound represented by Chemical formula 2, defoamability deteriorated.

Since the overcoating liquid of Comparative Example 6 contained no compound represented by Chemical formula 1, image blur occurred.

According to the present invention, an overcoating liquid is provided which has excellent defoamability and is capable of forming images on coated paper for commercial printing with excellent fixability while reducing occurrence of image blur and an inkset containing the overcoating liquid is also provided.

Having now fully described embodiments of the present invention, it will be apparent to one of ordinary skill in the art that many changes and modifications can be made thereto without departing from the spirit and scope of embodiments of the invention as set forth herein.

What is claimed is:

1. An overcoating liquid comprising:
a hydrodispersible polyurethane that includes at least one of polyacrylate-urethane and polycarbonate-urethane;
a compound represented by Chemical formula 1: $C_6F_{13}$—$CH_2CH_2O(CH_2CH_2O)_nH$, where n represents an integer of from 1 to 40;
a compound represented by Chemical formula 2: $HOR_1R_3C$—$(CH_2)_n$—$CR_2R_4OH$, where $R_1$ and $R_2$ each, independently represent alkyl groups having three to six carbon atoms, $R_3$ and $R_4$ each, independently represent methyl groups or ethyl groups, and n represents an integer of from 1 to 6; and
water,
wherein the overcoating liquid is applied to a surface of a recording medium on which inkjet ink is already discharged.

2. The overcoating liquid according to claim 1, wherein the compound represented by Chemical formula 1 accounts for 0.05% by weight to 1% by weight.

3. The overcoating liquid according to claim 1, wherein the compound represented by Chemical formula 2 is 2,4,7,9-tetramethyl-4,7-decane diol.

4. The overcoating liquid according to claim 1, wherein the compound represented by Chemical formula 2 accounts for 0.2% by weight to 1% by weight.

5. The overcoating liquid according to claim 1, further comprising polyethylene wax.

6. The overcoating liquid according to claim 5, wherein a mass ratio of the polyethylene wax to the hydrodispersible polyurethane ranges from 0.1 to 1.

7. An inkset comprising:
an inkjet ink comprising:
a hydrodispersible colorant,
a surfactant,
a hydrosoluble organic solvent, and
water; and
an overcoating liquid comprising:
a hydrodispersible polyurethane that includes at least one of polyacrylate-urethane and polycarbonate-urethane;
a compound represented by Chemical formula 1: $C_6F_{13}$—$CH_2CH_2O(CH_2CH_2O)_nH$, where n represents an integer of from 1 to 40;
a compound represented by Chemical formula 2: $HOR_1R_3C$—$(CH_2)_n$—$CR_2R_4OH$, where $R_1$ and $R_2$ each, independently represent alkyl groups having three to six carbon atoms, $R_3$ and $R_4$ each, independently represent methyl groups or ethyl groups, and n represents an integer of from 1 to 6; and
water,
wherein the overcoating liquid is applied to a surface of a recording medium on which the inkjet ink is already discharged.

8. An image forming method comprising:
discharging inkjet ink to a recording medium comprising a substrate; and
applying the overcoating liquid of claim 1 to a surface of the recording medium on which the inkjet ink is already discharged,
wherein the inkjet ink comprises a hydrodispersible colorant, a wetting agent, a surfactant, a permeating agent, and water.

9. The image forming method according to claim 8, further comprising heat-fixing the overcoating liquid on the recording medium.

10. The image forming method according to claim 8, wherein a coated layer is formed on one or both sides of the substrate and a transfer amount of pure water ranges from 1 mL/m$^2$ to 10 mL/m$^2$ when a contact time of a surface on which the coated layer is formed is 100 ms.

11. An image forming apparatus comprising:
- a discharging device to discharge inkjet ink to a recording medium;
- the overcoating liquid of claim 1;
- an application device to apply the overcoating liquid to a surface of the recording medium on which the inkjet ink is already discharged,
- wherein the inkjet ink comprises a hydrodispersible colorant, a wetting agent, a surfactant, a permeating agent, and water.

* * * * *